United States Patent
Traver et al.

(10) Patent No.: US 11,137,943 B2
(45) Date of Patent: Oct. 5, 2021

(54) INTERNAL COMMANDS FOR ACCESS OPERATIONS

(71) Applicant: Micron Technology, Inc., Boise, ID (US)

(72) Inventors: John Traver, Boise, ID (US); Ning Zhao, Milpitas, CA (US); Tom V. Geukens, Longmont, CO (US); Yun Li, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 37 days.

(21) Appl. No.: 16/809,371

(22) Filed: Mar. 4, 2020

(65) Prior Publication Data

US 2021/0278995 A1    Sep. 9, 2021

(51) Int. Cl.
*G06F 3/06* (2006.01)
*G06F 11/07* (2006.01)

(52) U.S. Cl.
CPC .......... *G06F 3/0659* (2013.01); *G06F 3/0619* (2013.01); *G06F 3/0631* (2013.01); *G06F 3/0653* (2013.01); *G06F 3/0679* (2013.01); *G06F 11/073* (2013.01)

(58) Field of Classification Search
CPC .... G06F 3/0659; G06F 3/0653; G06F 3/0619; G06F 3/0679; G06F 3/0631; G06F 11/073
See application file for complete search history.

(56) References Cited

U.S. PATENT DOCUMENTS

| | | | |
|---|---|---|---|
| 6,647,016 B1* | 11/2003 | Isoda | G06F 13/122 370/412 |
| 7,076,636 B1* | 7/2006 | Chilton | G06F 12/0871 711/113 |
| 10,852,956 B1* | 12/2020 | Li | G06F 13/1636 |
| 2004/0215840 A1* | 10/2004 | Shimura | H04L 12/40123 710/1 |
| 2012/0213492 A1* | 8/2012 | Takeuchi | H04N 13/183 386/244 |
| 2016/0154594 A1* | 6/2016 | Kang | G06F 3/0688 711/103 |
| 2017/0123682 A1* | 5/2017 | Sinclair | G06F 3/0611 |
| 2019/0004798 A1* | 1/2019 | Zbiciak | G06F 9/3016 |
| 2019/0102178 A1* | 4/2019 | Zbiciak | G06F 9/3802 |
| 2019/0278523 A1* | 9/2019 | Benisty | G06F 3/0629 |
| 2020/0201571 A1* | 6/2020 | Jung | G06F 12/0862 |
| 2021/0096779 A1* | 4/2021 | Kotzur | G06F 3/0689 |

* cited by examiner

*Primary Examiner* — Hiep T Nguyen
(74) *Attorney, Agent, or Firm* — Holland & Hart LLP (57) ABSTRACT

Methods, systems, and devices for internal commands for access operations are described. A memory sub-system can receive a request to perform an access operation. A first core of the memory sub-system can generate an internal command for performing the access operation. The internal command can include information for storing in a reference queue of the memory sub-system and an identification of a command entry of the reference queue. The first core can issue the internal command to perform the access operation and a second core of the memory sub-system can store the information in the command entry of the reference queue.

20 Claims, 5 Drawing Sheets

INTERNAL COMMANDS FOR ACCESS OPERATIONS

TECHNICAL FIELD

The following relates generally to a memory sub-system and more specifically to internal commands for access operations.

BACKGROUND

A memory sub-system can be a storage device, a memory module, and a hybrid of a storage device and memory module. The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to internal commands for access operations. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A data block hereinafter refers to a unit of the memory device used to store data and can include a group of memory cells, a word line group, a word line, or individual memory cells.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

In traditional access operations of memory cells, such as negative-and (NAND) memory cells (e.g., NAND flash memory cells), commands can be transmitted from the host system to various memory dies. The commands can be associated with different access operations (e.g., read operations, write operations, etc.) to be performed on one or more memory cells. Traditionally, to perform an access operation, a command queue can be populated with an information relating to the access operation. The command stored in the queue can then be issued and the access operation can be performed. However, the command queue may be located in dedicated memory cells that is located relatively far away from a processor of the memory device, and accessing the command queue may therefore take additional time. The additional time used associated with accessing can increase latency when performing an access operation on one or more memory cells. A system to improve timing of an access operation can be beneficial.

Aspects of the present disclosure address the above and other deficiencies by utilizing an internal command (e.g., a B command) to perform an access operation on the memory sub-system. For example, a processing core (e.g., a first processing core, a frontend processing core) can generate an internal command for performing an access operation on the memory sub-system. The internal command can include identifying information relating to the access command. For example, the internal command can include information that is capable of being stored in the queue. When an internal command is issued, the associated access operation can be performed (e.g., by one or more backend processing cores).

In some embodiments, it can be useful to store information relating to the access operation in a queue (e.g., a reference queue) that is located in memory of the memory sub-system. When the internal command is issued, one or more second cores (e.g., backend cores) of the memory sub-system can populate the reference queue with the information relating to the access operation. That is, the structure of the internal command can allow for the access operation to be performed independent from the reference queue being populated. Any latency that would otherwise be incurred due to accessing the reference queue by the first processing core and the second processing core can be negated by signaling that information in the internal command. Utilizing internal commands to perform access operations on a memory sub-system can reduce latency and improve the timing associated with an access operation of a memory sub-system.

Features of the disclosure are initially described in the context of a computing environment as described with reference to FIG. 1. Features of the disclosure are described in the context of flow diagrams and block diagrams as described with reference to FIGS. 2-4. These and other features of the disclosure are further illustrated by and described with reference to a computer system that relates to internal commands for access operations as described with reference to FIG. 5.

Figure 1:
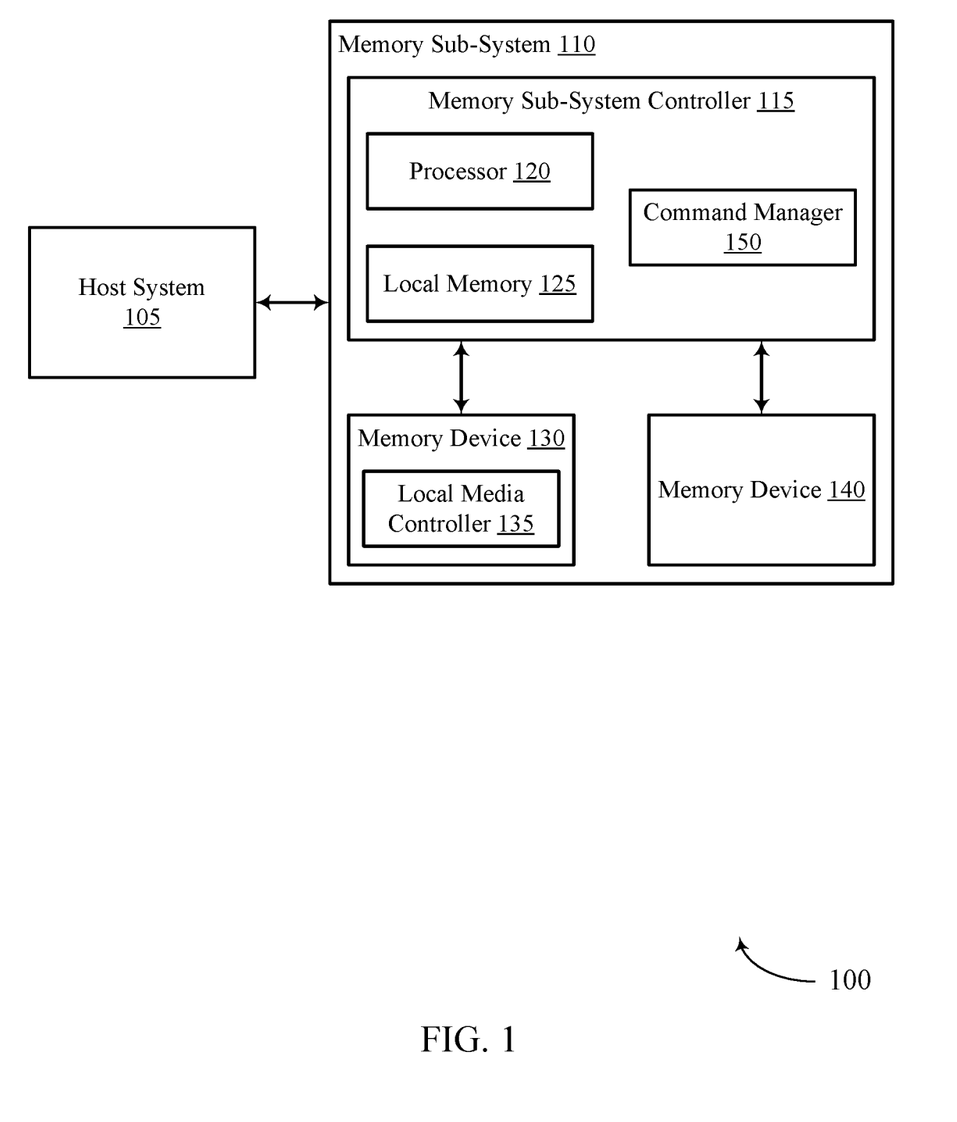
FIG. 1 illustrates an example of a computing system that includes a memory sub-system in accordance with some embodiments of the present disclosure.

FIG. 1 illustrates an example of a computing system 100 that includes memory sub-system 110 in accordance with some embodiments of the present disclosure. The memory sub-system 110 can include media, such as one or more non-volatile memory devices (e.g., memory device(s) 130), one or more volatile memory devices (e.g., memory device(s) 140), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM), and various types of non-volatile DIMM (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with one or more memory sub-systems 110. In some embodiments, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, USB interface, Fiber Channel, Small Computer System Interface (SCSI), Serial Attached SCSI (SAS), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 105 and the memory sub-system 110. The host system 105 can further utilize a non-volatile memory Express (NVMe) interface to access components (e.g., memory device(s) 130) when the memory sub-system 110 is coupled with the host system 105 by the PCIe interface. The physical host interface can provide an interface for passing control, address, data, and other signals between the memory sub-system 110 and the host system 105. FIG. 1 illustrates a memory sub-system 110 as an example. In general, the host system 105 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device(s) 140) can be, but are not limited to, random access memory (RAM), such as dynamic RAM (DRAM) and synchronous DRAM (SDRAM).

Some examples of non-volatile memory devices (e.g., memory device 130) include negative-and (NAND) type flash memory and write-in-place memory, such as three-dimensional cross-point ("3D cross-point") memory, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric RAM (FeRAM), magneto RAM (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable ROM (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination of such. The memory sub-system controller 115 can be a microcontroller, special purpose logic circuitry (e.g., a field programmable gate array (FPGA), an application specific integrated circuit (ASIC), a digital signal processor (DSP)), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some embodiments, the local memory 125 can include memory registers storing memory pointers, fetched data, etc. The local memory 125 can also include ROM for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 and/or the memory device 140 as well as convert responses associated with the memory devices 130 and/or the memory device 140 into information for the host system 105.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a command manager 150 that can handle communications between the memory sub-system 110 and the host system 105. Some memory sub-systems 110 can include more than one processing core to perform operations. For example, the memory sub-system 110 can include a first processing core to generate and issue internal commands (e.g., B commands) that are configured to initiate an access operation on the memory sub-system 110. The internal command can include information to be stored in a queue (e.g., a reference queue) that allows the memory sub-system 110 to manage access operations. When a first core issues an internal command, the associated access operation can be performed on the memory cell(s) by a second processing core. Additionally or alternatively, the second processing core can store information associated with the access operation in the reference queue.

In some embodiments, the memory sub-system controller 115 includes at least a portion of the command manager 150. For example, the memory sub-system controller 115 can include a processor 120 (e.g., a processing device) configured to execute instructions stored in local memory 125 for performing the operations described herein. In some embodiments, the command manager 150 is part of the host system 105, an application, or an operating system.

To mitigate latency due to the proximity between a reference queue and first processing core, the command manager 150 can be configured to initiate the issuance of internal commands by the first core, and initiate the storage of information associated with the internal command to the reference queue by the second core. For example, the command manager 150 can be configured to issue an internal command by the first processing core, which can result in the associated access operation being performed on the memory cell(s) by the second core. Additionally or alternatively, the command manager can initiate (e.g., instruct) the second core to store information associated with the internal command to the reference queue. Generating and issuing internal commands using a first core and storing information associated with the internal command to a reference queue using a second core can reduce latency in performing access operations and increase the overall processing capabilities of the memory sub-system 110.

The additional time used to access the queue often led to increased latency when performing an access operation on one or more memory cells. A system to improve timing of an access operation may be beneficial.

Figure 2:
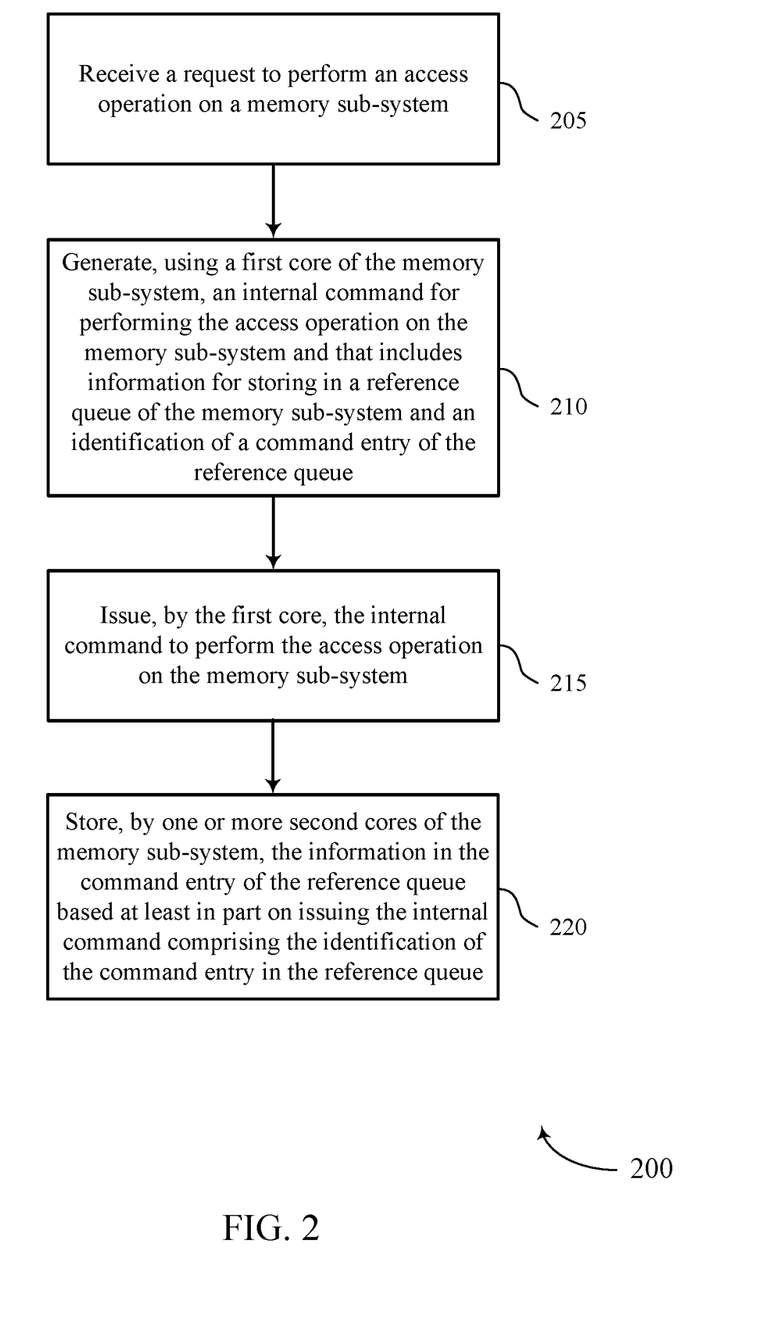
FIG. 2 is a flow diagram of an example method for internal commands for access operations in accordance with some embodiments of the present disclosure.

FIG. 2 is a flow diagram 200 of an example method for internal commands for access operations in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the command manager 150 of FIG. 1. Although shown in a particular sequence or order, unless otherwise specified, the order of the processes can be modified. The illustrated examples should be understood only as examples, and the illustrated processes can be performed in a different order, and some processes can be performed in parallel. Additionally, one or more processes can be omitted in various examples. Not all processes are required in every example. Other method flows are possible.

At operation 205, the processing logic receives a request to perform an access operation on the memory sub-system. The processing logic can receive the request from a host system.

At operation 210, the processing logic generates an internal command for performing the access operation on the memory sub-system. The internal command can be generated using a first core of the memory sub-system and can include information for storing in a reference queue of the memory sub-system and an identification of a command entry of the reference queue. In some embodiments, the internal command includes a read command for reading one page of data or a write command for writing one or more pages of data.

The internal command can be associated with a single command entry in the reference queue that is allocated for the internal command. In some embodiments, the internal command can be a first size for performing a read operation on the memory sub-system, and a second size for performing other access operations on the memory sub-system. The first size can be smaller than the second size. In some embodiments, the information of the internal command can include information for performing the access operation on the memory sub-system.

At operation 215, the processing logic issues the internal command to perform the access operation on the memory sub-system. The internal command can be issued by the first core of the memory sub-system.

At operation 220, the processing logic stores the information in the command entry of the reference queue. The information can be stored in the command entry by one or more second cores of the memory sub-system and can be stored based on issuing the internal command.

In some embodiments, the processing logic issues a response message that includes an indicator of the command entry in the reference queue and a status of the access operation. The response message can be issued by the second core of the memory sub-system. The processing logic determines whether the access operation was successfully performed based on receiving the response message. In some embodiments, the processing logic determines whether the access operation was successfully performed using the first core.

The processing logic can determine an error associated with the access operation based on receiving the response message. In some embodiments the processing logic retrieves the information of the internal command from a memory shared by the first core and an additional first core of the memory sub-system. The processing logic can correct the error associated with the access operation using the first core.

In some embodiments, the processing logic transmits a message to a host system indicating that the access operation was successfully performed. The processing logic can transmit the message using the first core. In some embodiments, the memory sub-system includes multiple first cores for communicating with the host system and multiple second cores for communicating with the memory device of the memory sub-system. The second cores can be different than the first cores.

The processing logic identifies the command entry in the reference queue. In some embodiments, the reference queue can include multiple command entries for performing access operations on the memory sub-system. The processing logic can identify the command entry in the reference queue using the first core of the memory sub-system. In some embodiments, the processing logic performs the access operation on the memory sub-system. The processing logic can perform the access operation using the second core.

Figure 3:
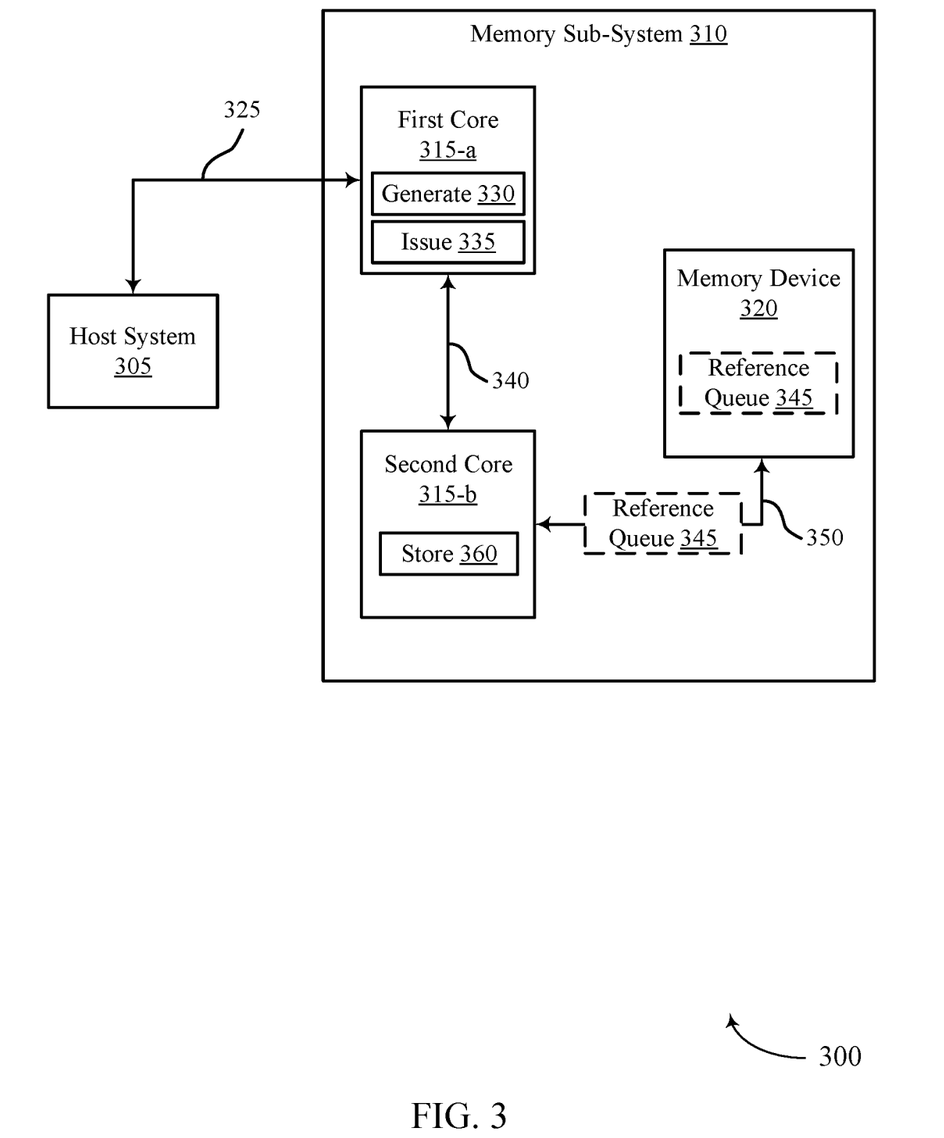
FIG. 3 is a block diagram of an example system for internal commands for access operations in accordance with some embodiments of the present disclosure.

FIG. 3 is a block diagram of an example system 300 for internal commands for access operations in accordance with some embodiments of the present disclosure. The system 300 can include a host system 305 in communication with a memory sub-system 310. The host system 305 can be an example of the host system 105 described with reference to FIG. 1. The memory sub-system 310 can be an example of the memory sub-system 110 described with reference to FIG. 1. The components of the memory sub-system 310 can receive and transmit communications associated with an access operation (e.g., a read operation and/or a write operation).

In some embodiments, the access operation can be associated with one or more memory cells (e.g., NAND memory cells) of the memory device 320. To perform the access operation, different operations can be performed by different processing cores. For example, a portion of the access operation can relate to generating an internal command and issuing the internal command to perform the access operation on the memory sub-system 310. In some embodiments, an internal command can be or can refer to a B command. This portion can be performed by the first core 315-a. Another portion of the access operation can relate to storing information in a command entry of a reference queue 345, which can be performed by the second core 315-b. The reference queue 345 can, in some examples, be included within the memory device 320 or can be located external to the memory device 320. The second core 315-b can also access the memory cells of the memory device based on receiving an internal command from a first core 315-a. In some embodiments, the reference queue can be populated with information relating to the access command in order for the access command to be performed. The portions of the access operation can be performed by one or more processing cores associated with the various managers and/or devices. Information processed by one or more processing cores associated with the first core manager can be directed to one or more processing cores associated with the second core manager through one or more processing cores associated with a translation manager. Additional details about processing cores of the various manager is described with reference to FIG. 4.

The system 300 can include host system 305 in communication with memory sub-system 310. Memory sub-system 310 can include first core 315-a, a second core 315-b, and a memory device 320. The first core 315-a and the second core 315-b of memory sub-system 310 can be examples of processing cores associated with a translation manager of the memory sub-system 310. In some embodiments, the first core 315-a can include multiple cores (e.g., four (4) cores) and the second core 315-b can include multiple cores (e.g., four (4) cores). The memory sub-system 310 can include firmware that includes a first core manager (e.g., a frontend layer), a translation manager, and a second core manager, each being associated with processing cores.

The host system 305 can issue an access command 325 (e.g., a read command, write command, or other type of command) to retrieve data from memory sub-system 310. Memory sub-system 310 can receive the access command 325 to retrieve data from the memory device 320 on behalf of the host system 305.

The access command 325 can be received and processed by the first core 315-a of the memory sub-system 310. When processing the access command 325, the first core 315-a can identify the type of the access command 325 received from the host system 305 or identify one or more parameters of the access command 325.

At operation 330, the first core 315-a can generate an internal command for performing the access operation on the memory device 320. The internal command can include information for storing in the reference queue 345 and an identification of a command entry of the reference queue 345. In some embodiments, the reference queue 345 can be hardware the memory sub-system 310 uses for performing access commands on the memory device 320 and can store information relating to various access commands. The command entries in the reference queue 345 can be associated with various internal commands. For example, there can be a 1:1 relationship between internal commands and command entries of the reference queue 345. That is, the internal command can be allocated to a particular slot in the reference queue (e.g., slot number 1). The internal command can be populated with information that indicates slot number 1 for error handling or other purposes, as described herein.

When an internal command is generated by the first core 315-a, a command entry in the reference queue 345 can be allocated for the internal command. Information associated with the command entry in the reference queue 345 can be used to generate the internal command, which can allow for the first core 315-a to determine whether the associated access operation was successfully performed. That is, the relationship between internal commands and command entries of the reference queue 345 can allow for the memory sub-system to make certain determinations about an access operation that are related to performance (e.g., whether an access operation was successful), quality (e.g., error handling), and the like.

In some embodiments, the first core 315 can include memory that is shared between each of the cores. For example, the first core 315-a can include four (4) cores that share a memory between the cores. The memory can be used to store (e.g., temporarily store) the generated internal commands. Once an internal command is generated, the internal command can be stored in the shared memory and can be issued (e.g., issued to the memory device 320) from the memory. In some embodiments, the internal command can remain stored in the shared memory until one or more performance and/or quality determinations are made. For example, if the access operation is unsuccessful, the memory device 320 (and/or the second core 315-b) can indicate such to the first core 315-a.

The first core 315-a can receive an indication of the internal command (e.g., an identifier of the internal command) and a status of the access operation, and can compare the status with the internal command stored in the shared memory. By storing internal commands in memory shared by the first core 315-a, the first core 315-a can receive a relatively small message (e.g., an indication of the internal command and a status of the access operation), which can improve performance of the memory sub-system. Utilizing internal commands in for access operations can also save time associated with access operations. For example, an internal command can be issued to perform an access operation before information is stored in the command entry of the reference queue 345. Due to the location of the reference queue 345 (i.e., due to the proximity of the reference queue 345 to the first core 315-a), accessing the reference queue 345 in order to perform an access operation can be time consuming. However, by accessing the memory device 320 using an internal command (e.g., independent from accessing the reference queue 345), an access operation can be performed faster.

At operation 335, the first core 315-a can issue the internal command to the memory device 320. The internal command can be issued to the memory device 320, for example, via the second core 315-b (and communication channels 350 and 350, for example). When the internal command is received at the memory device 320, the access operation can be performed on the associated memory cell(s). In some embodiments, the access operation can be performed by the second core 315-b. The second core 315-b can be better-equipped to perform the access command. That is, the first core 315-a can be responsible for performing operations such as generating the internal command; the second core 315-b can be responsible for performing fewer operations, allowing to perform the access operation. The properties of the internal command can be based on a type operation to be performed. For example, the internal command can be associated with an access operation for a single page of data or multiple pages of data (e.g., a multi-plane read or write).

In addition to indicating a type of access operation, the size of the internal command can be variable. For example, the size of the internal command can vary for single page access operations versus multi-plane access operations, and also for read operations versus write operations. In some embodiments, an internal command can be larger (e.g., include more information, be a larger size, etc.) for multi-plane access operations (versus single page access operations) and for write operations (versus read operations). That is, internal commands associated with single page access operations and read operations can be smaller in size than internal commands associated with multi-place access operations and write operations (or access operations other than read operations).

At operation 360, the second core 315-b can store information associated with the internal command in a command entry of the reference queue 345. The information can be stored to the reference queue 345 by way of, for example, communication channel 340 and/or communication channel 350, which can be two-way communication channels. That is, the first core 315-a can communicate with the second core 315-b (and vice versa) via communication channel 340, and the second core 315-b can communicate with the memory device 320 (and vice versa) via communication channel 350. The first core 315-a can communicate the information of the internal command to the second core 315-b, which can store the information to the command entry in the reference queue 345.

Storing information associated with the internal command to the command entry in the reference queue 345 can allow the memory sub-system 310 to efficiently perform tasks related to performance (e.g., whether an access operation was successful), quality (e.g., error handling), and the like. For example, the information in the command entry of the reference queue 345 that is associated with the internal command can be updated to indicate a status of the access operation (e.g., whether the access operation was successfully or unsuccessfully performed). This information can be provided to the first core 315-a, which can then efficiently determine whether the access operation was successful or whether the access operation needs to be performed again.

Additionally or alternatively, by utilizing the second core 315-b to store the information to the command entry in the reference queue 345, the first core 315-a can continue processing access commands, generating internal commands, determining whether access operations are successfully performed, and the like. That is, the second core 315-*b* can store the information to the command entry in the reference queue 345 while the first core 315-*a* is performing other operations, which can improve the overall performance and timing of access operations of the memory sub-system.

In other examples, one or more command entries in the reference queue 345 can include a status of an associated access operation. For example, if an access operation associated with a particular command entry is successful, the command entry can be updated accordingly. The second core 315-*b* can generate and issue a message to the first core 315-*a* that includes both an indicator of the particular command entry in the reference queue 345 and an associated status. When the first core 315-*a* receives the message, the first core 315-*a* can determine whether the access operation was successfully (or unsuccessfully) performed based on the status associated with the command entry included in the message.

For example, the first core 315-*a* can receive an access command from the host system 305 and can generate an associated internal command. The internal command can be temporarily stored in memory shared by the first core 315-*a* and can be issued to the memory device 320. After issuing the internal command, information associated with the internal command can be stored (e.g., by the second core 315-*b*) to the command entry of the reference queue 345. The access operation can be performed successfully, and the information associated with the internal command stored in the command entry can be updated accordingly. The second core 315-*b* can generate a message that includes identifying information about the internal command associated with the successful access operation, and that the access operation was successfully performed. This message can be provided to the first core 315-*a*, which can identify the internal command based on the identifying information. The first core 315-*a* can also determine that the access operation associated with the internal command was successfully performed and, in some examples, can indicate such to the host system 305.

In the event that an access operation was unsuccessful, the first core 315-*a* can determine an error associated with the access operation. For example, if an access operation associated with a particular command entry is unsuccessful, the command entry can be updated accordingly. The second core 315-*b* can generate and issue a message to the first core 315-*a* that includes the indicator of the particular command entry in the reference queue 345 and an associated status. When an access operation is unsuccessful, the first core 315-*a* can use the identifying information to access the internal command stored in the shared memory. A different first core 315-*a* can be responsible for error handling than for generating and/or issuing the internal command. For example, one first core 315-*a* can generate and/or issue the internal command and another first core 315-*a* can correct any errors associated with the access operation.

In some embodiments, the first core 315-*a* can correct the error that occurred during the access operation, which can include re-issuing the internal command to perform the access operation on the memory device 320. In some embodiments, the first core 315-*a* and the second core 315-*b* can continue respective operations until the error is corrected and the access operation is successfully performed. When the access operation is successfully performed, the first core 315-*a* can indicate such to the host system 305.

Figure 4:
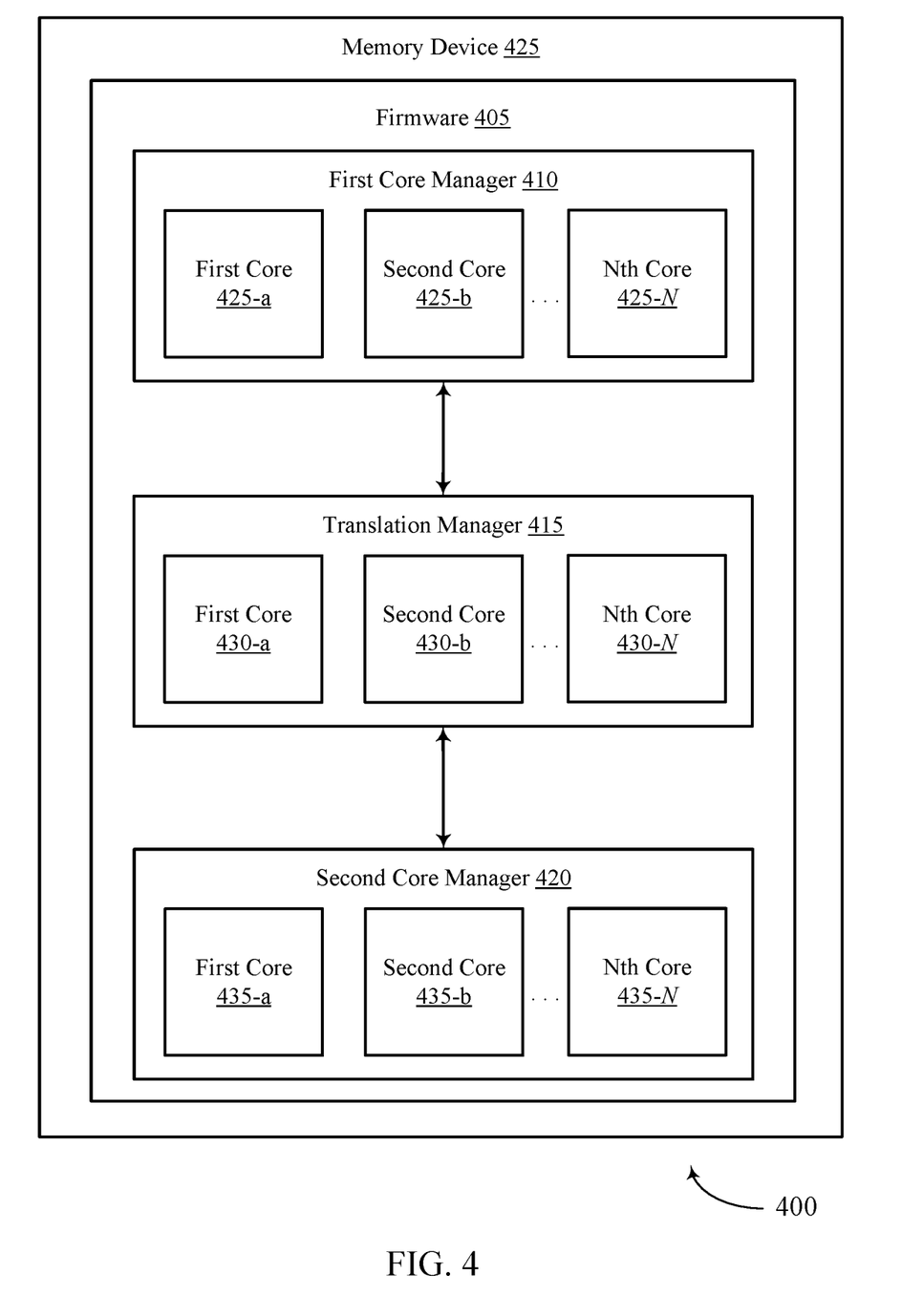
FIG. 4 is a block diagram of an example memory sub-system for internal commands for access operations in accordance with some embodiments of the present disclosure.

FIG. 4 is a block diagram of an example memory sub-system 400 for internal commands for access operations in accordance with some embodiments of the present disclosure. A memory sub-system can include firmware 405. The firmware 405 can include a first core manager 410 (sometimes referred to as a frontend layer), a translation manager 415 (sometimes referred to as a flash translation layer or FTL), and a second core manager 420 (sometimes referred to as a backend layer). A core can be an example of a processor (e.g., processor 120), one or more portions of a processor, a processing device (e.g., processing device 505), one or more portions of a processing device, or combinations of such, as described herein. A core can be any circuit, processor, hardware, or device configured to execute one or more instructions to perform one or more operations.

First core manager 410 can be configured as an interface between the host system and the memory sub-system. For example, the first core manager 410 can be configured to receive, process, and/or interpret commands and other communications received from the host system and transmitted to the host system. One or more cores 425 can be used to perform the functions of the first core manager 410. For example, a first core 425-*a*, a second core 425-*b*, and an Nth core 425-N can be used to implement the functions of the first core manager 410. In some embodiments, these cores 425 are dedicated to performing the functions of the first core manager 410. In some embodiments, one or more these cores 425 can be used to perform the functions of the first core manager 410, the translation manager 415, or the second core manager 420, or combinations of such. N can represent any positive integer of cores.

Second core manager 420 can be configured as an interface between the memory sub-system and the memory device of the memory sub-system. For example, the second core manager 420 can be configured to receive, process, and/or interpret data and other communications received from the memory device and transmitted to the memory device. One or more cores 435 can be used to perform the functions of the second core manager 420. For example, a first core 435-*a*, a second core 435-*b*, and an Nth core 435-N can be used to implement the functions of the second core manager 420. In some embodiments, these cores 435 are dedicated to performing the functions of the second core manager 420. In some embodiments, one or more these cores 435 can be used to perform the functions of the first core manager 410, the translation manager 415, or the second core manager 420, or combinations of such. N can represent any positive integer of cores.

Translation manager 415 can be configured as an interface between the first core manager 410 and the second core manager 420. In some implementations, the commands and signaling scheme used by the host system can be different than the command and signaling scheme used by the memory device. To facilitate communications between the host system and the memory device that stores data on behalf of the host system, the translation manager 415 can translate or otherwise convert host system information to memory device information and vice-versa. One or more cores 430 can be used to perform the functions of the translation manager 415. For example, a first core 430-*a*, a second core 430-*b*, and an Nth core 430-N can be used to implement the functions of the translation manager 415. In some embodiments, these cores 430 are dedicated to performing the functions of the translation manager 415. In some embodiments, one or more these cores 430 can be used to perform the functions of the translation manager 415, the translation manager 415, or the second core manager 420, or combinations of such. N can represent any positive integer of cores.

The first core 315-*a* and the second core 315-*b* described with reference to FIG. 3 can be examples of the core 425 and core 435 of the first core manager 410 and the second core manager 420, respectively. In such examples, the first core 315-*a* that receives the access command, and generates and issues the internal command can be any of the Nth cores 425-N. Additionally or alternatively, the second core 315-*b* that stores the information in the command entry of the reference queue can be any of the Nth cores 435-N. In some instances, the first core 425-*a* of the first core manager 410 can receive the access command, and generate and issue the internal command. The access operation can be performed by one or more cores 430 of the translation manager 415, one or more cores 435 of the second core manager 420, the memory device, or combinations of such. For example, one or more cores 430 and one or more cores 435 can be used to perform an access operation based on a core 425 issuing an internal command. In some embodiments, one or more cores 435 of the second core manager 420 can store the information in the command entry of the reference queue based on one of cores 425 issuing the internal command.

Figure 5:
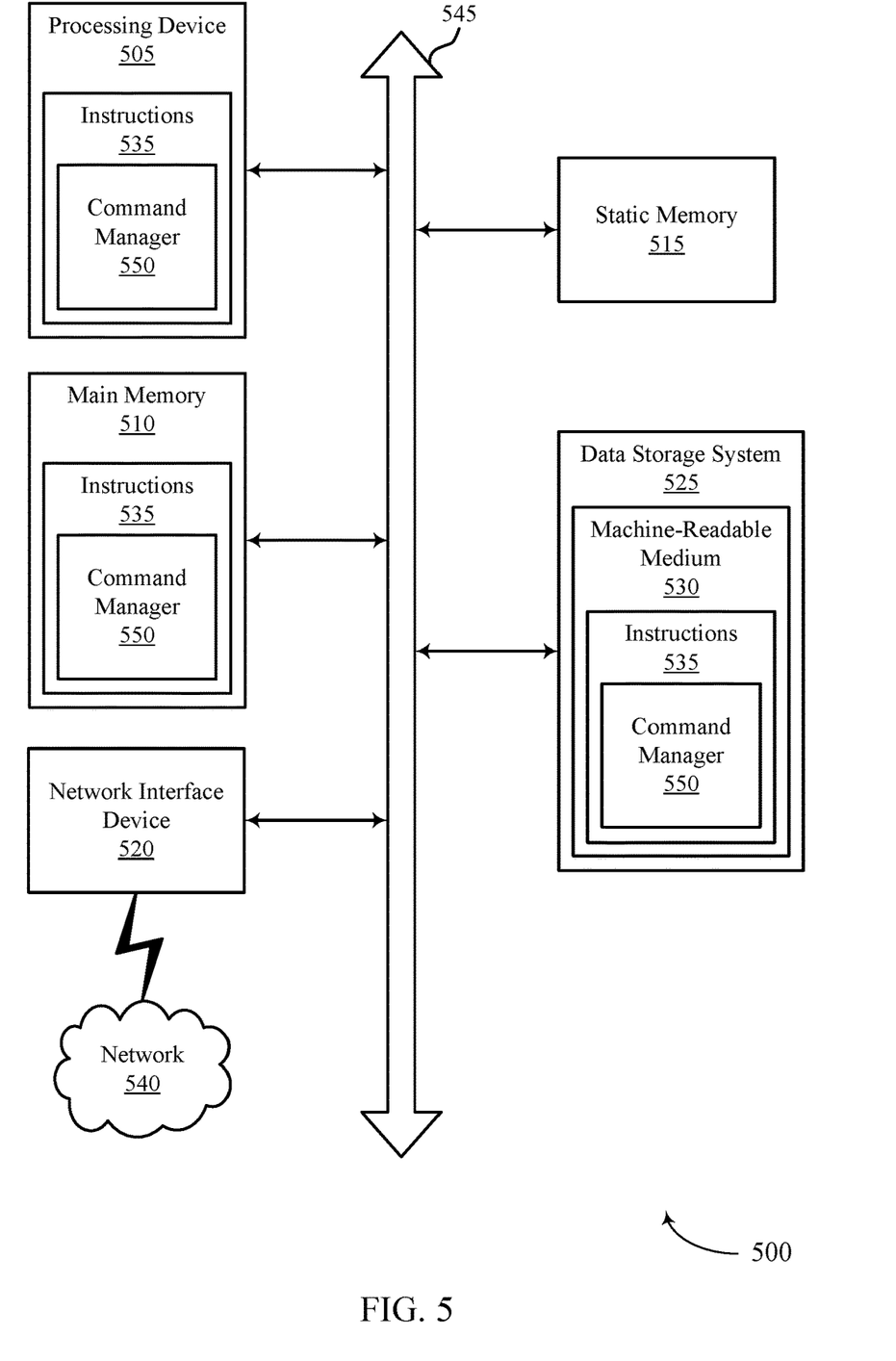
FIG. 5 is a block diagram of an example computer system in which embodiments of the present disclosure can operate.

FIG. 5 is a block diagram of an example computer system 500 in which embodiments of the present disclosure can operate. The computer system 500 can include a set of instructions, for causing the machine to perform any one or more of the techniques described herein. In some embodiments, the computer system 500 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the command manager 150 described with reference to FIG. 1). In some embodiments, the machine can be connected (e.g., networked) with other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 500 can include a processing device 505, a main memory 510 (e.g., ROM, flash memory, DRAM such as SDRAM or Rambus DRAM (RDRAM), etc.), a static memory 515 (e.g., flash memory, static RAM (SRAM), etc.), and a data storage system 525, which communicate with each other via a bus 545.

Processing device 505 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 505 can also be one or more special-purpose processing devices such as an ASIC, an FPGA, a DSP, network processor, or the like. The processing device 505 is configured to execute instructions 535 for performing the operations and steps discussed herein. The computer system 500 can further include a network interface device 520 to communicate over the network 540.

The data storage system 525 can include a machine-readable storage medium 530 (also known as a computer-readable medium) on which is stored one or more sets of instructions 535 or software embodying any one or more of the methodologies or functions described herein. The instructions 535 can also reside, completely or at least partially, within the main memory 510 and/or within the processing device 505 during execution thereof by the computer system 500, the main memory 510 and the processing device 505 also constituting machine-readable storage media. The machine-readable storage medium 530, data storage system 525, and/or main memory 510 can correspond to a memory sub-system.

In one example, the instructions 535 include instructions to implement functionality corresponding to a command manager 550 (e.g., the command manager 150 described with reference to FIG. 1). While the machine-readable storage medium 530 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A method, comprising:
    receiving a request to perform an access operation on a memory sub-system;
    generating, using a first core of the memory sub-system, an internal command for performing the access operation on the memory sub-system and that comprises information for storing in a reference queue of the memory sub-system and an identification of a command entry of the reference queue;
    issuing, by the first core, the internal command to perform the access operation on the memory sub-system; and
    storing, by one or more second cores of the memory sub-system, the information in the command entry of the reference queue based at least in part on issuing the internal command comprising the identification of the command entry in the reference queue.

2. The method of claim 1, further comprising:
    issuing, by the one or more second cores, a response message comprising an indicator of the command entry in the reference queue and a status of the access operation; and
    determining, by the first core, whether the access operation was successfully performed based at least in part on receiving the response message.

3. The method of claim 2, further comprising:
    determining, at the first core, an error associated with the access operation based at least in part on receiving the response message.

4. The method of claim 3, further comprising:
    retrieving the information of the internal command from a memory shared by the first core and an additional first core of the memory sub-system; and
    correcting, at the first core of the memory sub-system, the error associated with the access operation.

5. The method of claim 2, further comprising:
    transmitting, by the first core, a message to a host system indicating that the access operation was successfully performed.

6. The method of claim 1, wherein the internal command for performing the access operation comprises a read command for reading one page of data or a write command for writing one or more pages of data.

7. The method of claim 1, wherein the internal command is associated with a single command entry in the reference queue that is allocated for the internal command.

8. The method of claim 1, wherein the internal command comprises a first size for performing a read operation on the memory sub-system, and a second size for performing other access operations on the memory sub-system, wherein the first size is smaller than the second size.

9. The method of claim 1, wherein the memory sub-system comprises:
    a plurality of first cores for communicating with a host system; and
    a plurality of second cores different than the plurality of first cores and for communicating with a memory device of the memory sub-system.

10. The method of claim 1, further comprising:
    identifying, using the first core of the memory sub-system, the command entry in the reference queue, wherein the reference queue comprises a plurality of command entries, the plurality of command entries for performing access operations on the memory sub-system.

11. The method of claim 1, further comprising:
    performing, by the one or more second cores, the access operation on the memory sub-system.

12. The method of claim 1, wherein the information of the internal command comprises:
    information for performing the access operation on the memory sub-system.

13. A system, comprising:
    a plurality of memory components; and
    a processing device, operatively coupled with the plurality of memory components, to:
        receive a request to perform an access operation on a memory sub-system;
        generate, using a first core of the memory sub-system, an internal command for performing the access operation on the memory sub-system and that comprises information for storing in a reference queue of the memory sub-system and an identification of a command entry of the reference queue;
        issue, by the first core, the internal command to perform the access operation on the memory sub-system; and store, by one or more second cores of the memory sub-system, the information in the command entry of the reference queue based at least in part on issuing the internal command comprising the identification of the command entry in the reference queue.

14. The system of claim 13, further comprising:

the processing device further to:

issue, by the one or more second cores, a response message comprising an indicator of the command entry in the reference queue and a status of the access operation; and determine, by the first core, whether the access operation was successfully performed based at least in part on receiving the response message.

15. The system of claim 14, further comprising:

the processing device further to:

determine, at the first core, an error associated with the access operation based at least in part on receiving the response message.

16. The system of claim 15, further comprising:

the processing device further to:

retrieve the information of the internal command from a memory shared by the first core and an additional first core of the memory sub-system; and correct, at the additional first core of the memory sub-system, the error associated with the access operation.

17. The system of claim 14, further comprising:

the processing device further to:

transmit, by the first core, a message to a host system indicating that the access operation was successfully performed.

18. The system of claim 13, wherein the internal command for performing the access operation comprises a read command for reading one page of data or a write command for writing one or more pages of data.

19. The system of claim 13, wherein the internal command is associated with a single command entry in the reference queue that is allocated for the internal command.

20. A non-transitory computer-readable storage medium comprising instructions that, when executed by a processing device, cause the processing device to:

receive a request to perform an access operation on a memory sub-system;

generate, using a first core of the memory sub-system, an internal command for performing the access operation on the memory sub-system and that comprises information for storing in a reference queue of the memory sub-system and an identification of a command entry of the reference queue;

issue, by the first core, the internal command to perform the access operation on the memory sub-system; and store, by one or more second cores of the memory sub-system, the information in the command entry of the reference queue based at least in part on issuing the internal command comprising the identification of the command entry in the reference queue.

* * * * *